(12) United States Patent
Liu

(10) Patent No.: US 6,763,784 B1
(45) Date of Patent: Jul. 20, 2004

(54) MODULARIZED CAGE

(76) Inventor: Chin-Lung Liu, No. 183, Minsheng Rd., Wuteng Hsiang, Tai-Chung Hsien (TW)

(*) Notice: Subject to any disclaimer, the term of this patent is extended or adjusted under 35 U.S.C. 154(b) by 0 days.

(21) Appl. No.: 10/377,459

(22) Filed: Feb. 28, 2003

(51) Int. Cl.[7] .......................... A01K 1/03; A01K 31/06
(52) U.S. Cl. ...................................... 119/452
(58) Field of Search .................. 119/416, 417, 119/452, 453, 473, 461, 474, 479

(56) References Cited

U.S. PATENT DOCUMENTS

| | | | | |
|---|---|---|---|---|
| 2,759,622 A | * | 8/1956 | Simmons et al | 119/474 |
| 5,000,120 A | * | 3/1991 | Coiro et al. | 119/419 |
| 5,000,121 A | * | 3/1991 | Daily | 119/461 |
| 5,353,738 A | * | 10/1994 | Chiu | 119/461 |
| 6,192,834 B1 | * | 2/2001 | Kolozsvari | 119/498 |
| 6,460,486 B1 | * | 10/2002 | Powers et al. | 119/452 |
| 2001/0054394 A1 | * | 12/2001 | Marchioro | 119/452 |

FOREIGN PATENT DOCUMENTS

| | | | | |
|---|---|---|---|---|
| GB | 2097234 | * | 11/1982 | 119/416 |

* cited by examiner

*Primary Examiner*—Charles T. Jordan
*Assistant Examiner*—Judith A. Nelson
(74) *Attorney, Agent, or Firm*—Charles E. Baxley

(57) ABSTRACT

The present invention discloses a sectional cage, typically a birdcage designed as a combination of several modules, each module facilitating the reduction of the accommodating space and transportation cost. The cage of the present invention features an easy assembling and a stable and firm structure, and adapts different specifications and provides more choices for economical variation of its shape, assembly and disassembly.

6 Claims, 8 Drawing Sheets

MODULARIZED CAGE

BACKGROUND OF THE INVENTION

1. Field of the Invention

The present invention relates to a cage, more particularly to a modularized cage, typically a birdcage.

2. Description of the Related Art

A cage, such as a birdcage, is a necessary tool for breeding or selling pets like birds, and the size of the birdcage should be made according to the size and quantity of birds. Therefore, a breeder may provide an appropriate size of the cage to a cage manufacturer. If a manufactured cage is transported as is, it will occupy lots of space. Therefore, the structure of the birdcage designed in detachable modules for the purpose of easy transportation and assembling upon its arrival at the destination can effectively reduce transportation cost. Easy assembling and firm structure, and even more flexibility for changes and additional functions should be taken into consideration for the module design of the birdcage.

SUMMARY OF THE INVENTION

The primary objective of the present invention is to provide a sectional birdcage, designed in detachable modules for reducing accommodation space and lowering transportation cost. The birdcage of the present invention features easy assembly as well as stable and firm structure, and the birdcage adapts to different specifications and provides more choices for configuration under limitations of cost.

Technical measures taken to achieve the above stated objectives of the present invention, comprises:

a plurality of aluminum pressed pipes; the cross-sectional structure of each pipe having a hollow main pipe; a grid groove being disposed along the direction of the long axis on both sides of the exterior adjacent to the main pipe, and both ends of the grid groove being open; and an opening being disposed at the center of the exterior;

a plurality of three-way connectors made of a plastic material, each three-way connector having a main body, with an insert post being protruded from each of three sides adjacent to said main body for allowing an end of the main body of the pipe to be tightly pressed and pass through; and a plurality of metal grid plates, having a metal bar at its periphery slidably embedded into a groove of the grid plate of the pipe.

BRIEF DESCRIPTION OF THE DRAWINGS

Other features and advantages of the present invention will become apparent in the following detailed description of preferred embodiments with reference to the accompanying drawings, in which.

DETAILED DESCRIPTION OF THE PREFERRED EMBODIMENTS

Figure 1:
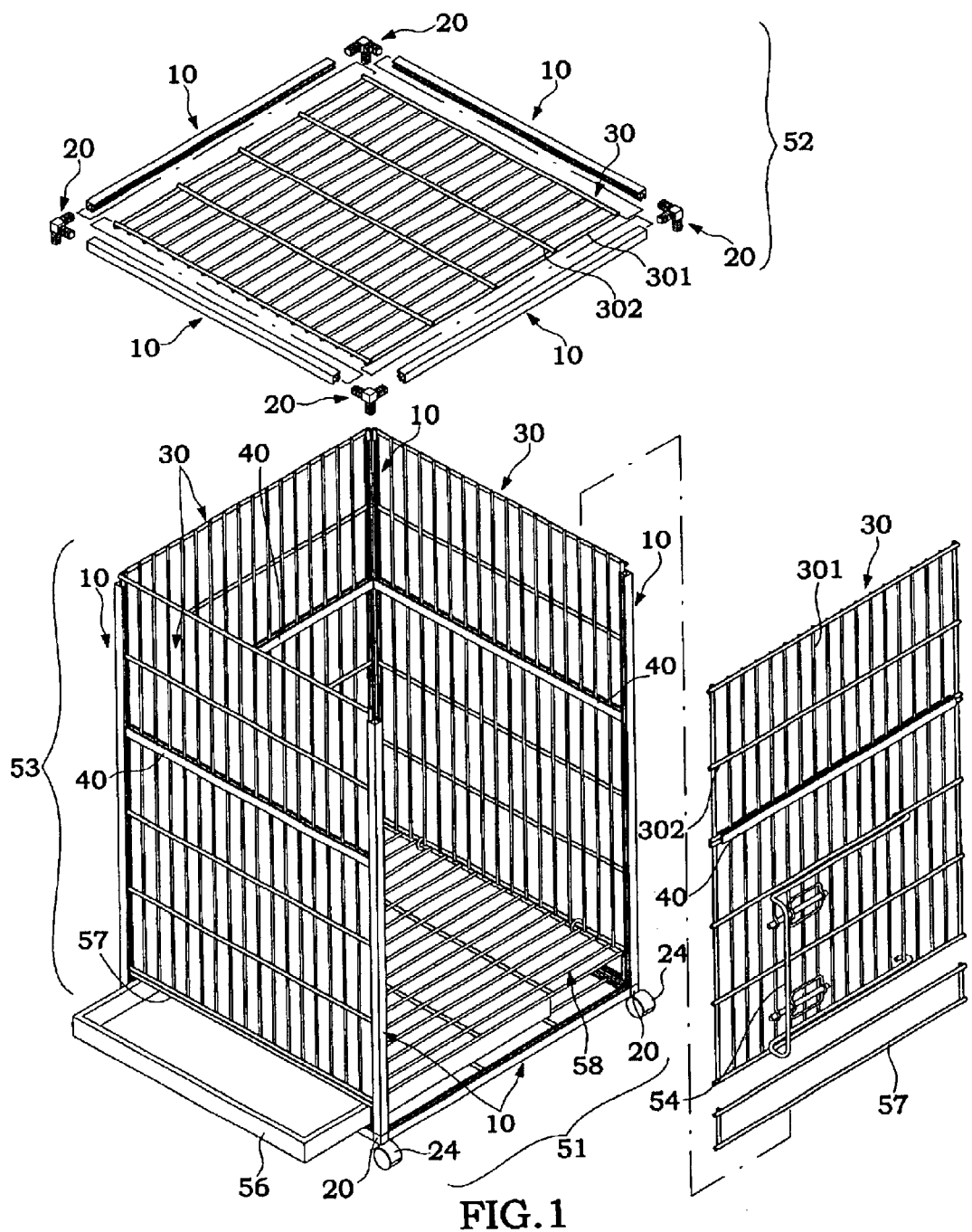
FIG. 1 is an exploded perspective view showing dissembled parts of the birdcage according to a first preferred embodiment of the present invention.
Figure 2:
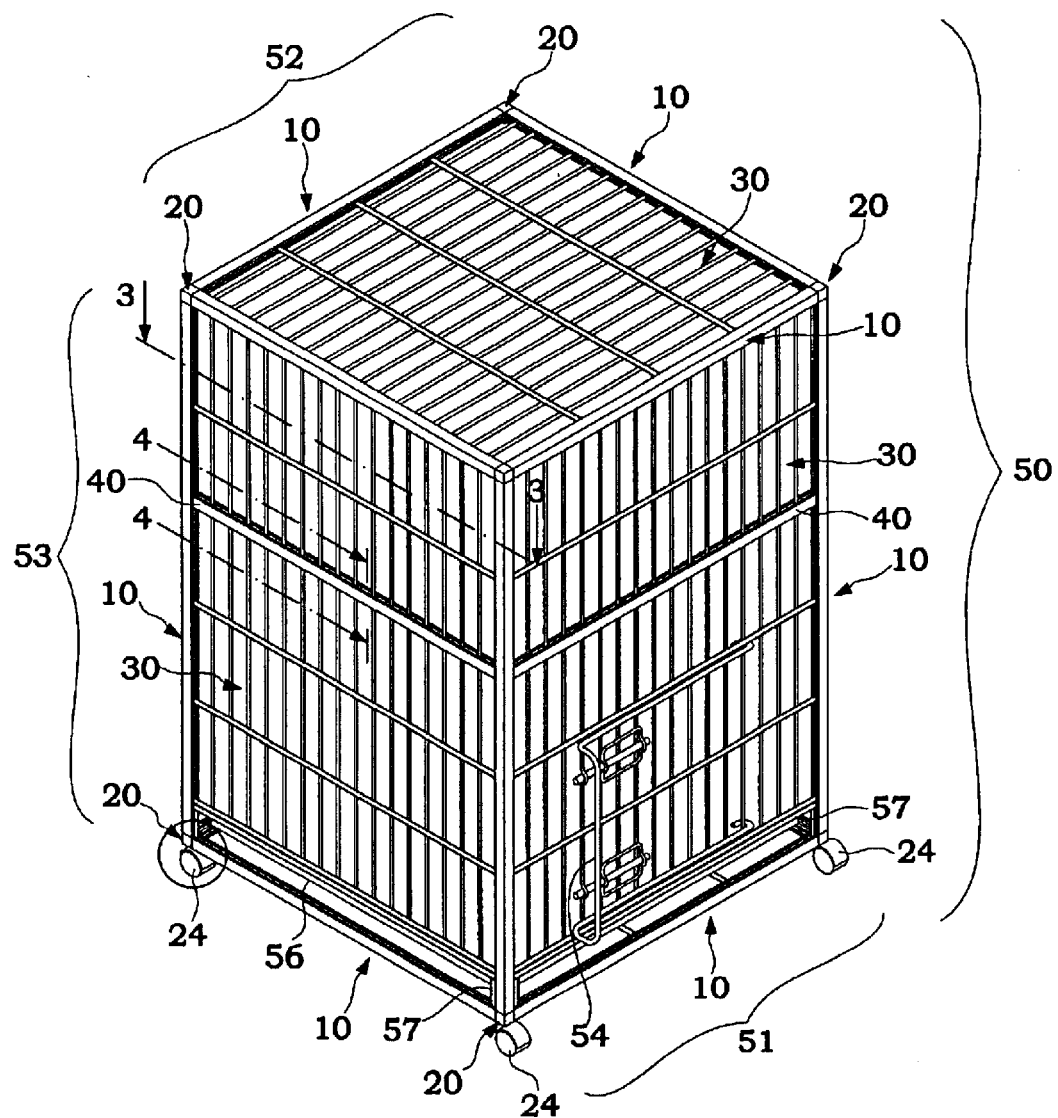
FIG. 2 is a perspective view showing the parts according to FIG. 1 assembled.
Figure 3:
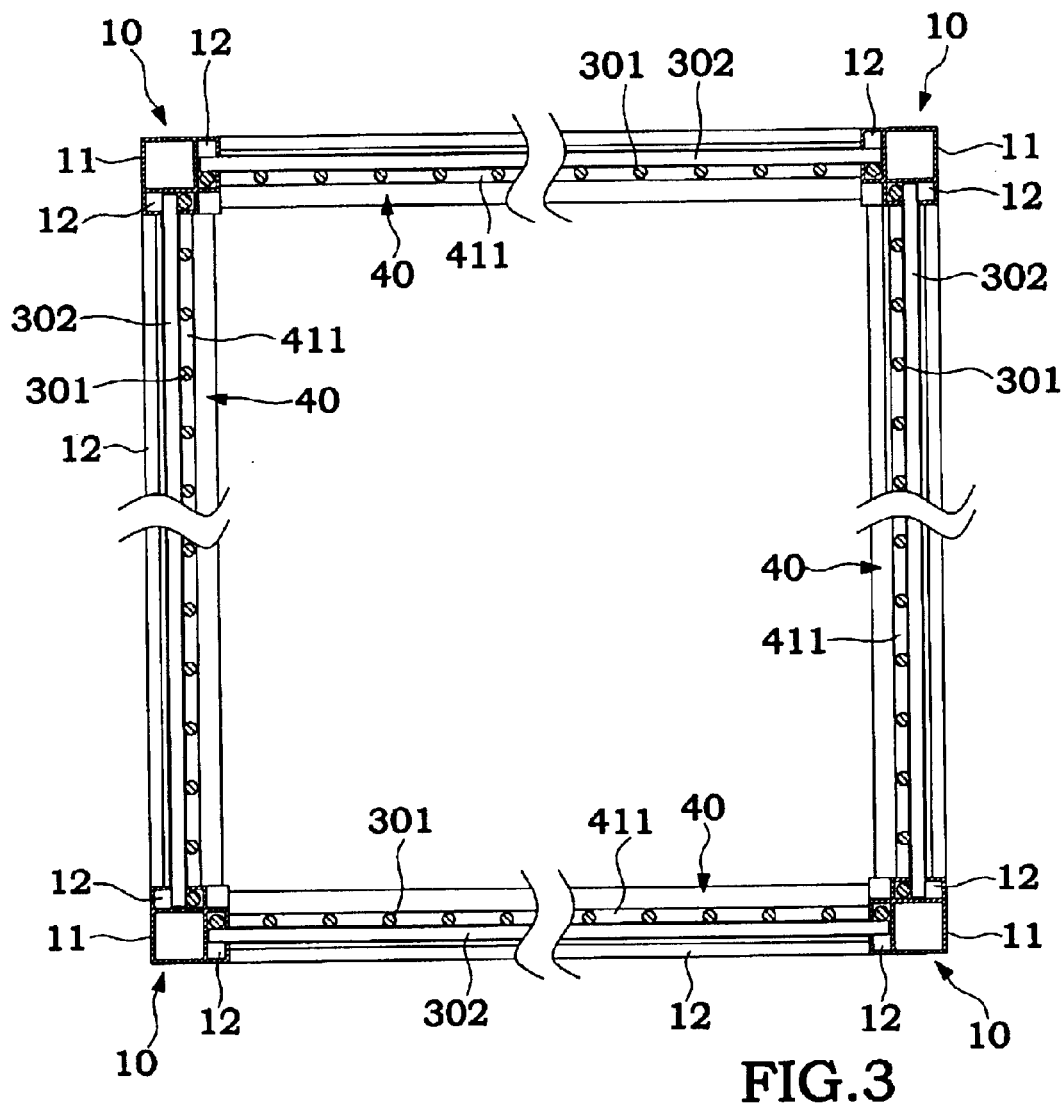
FIG. 3 is a cross-sectional view of the birdcage through cross-section 3—3 in a direction of arrows indicated in FIG. 2.
Figure 4:
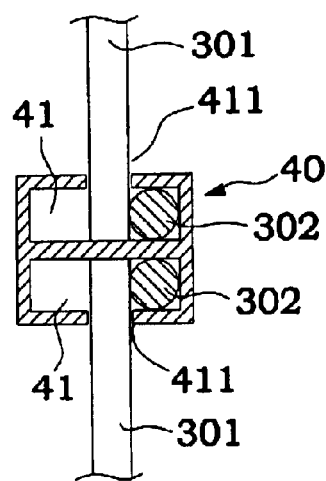
FIG. 4 is a cross-sectional view through cross-section 4—4 indicated in FIG. 2.
Figure 5:
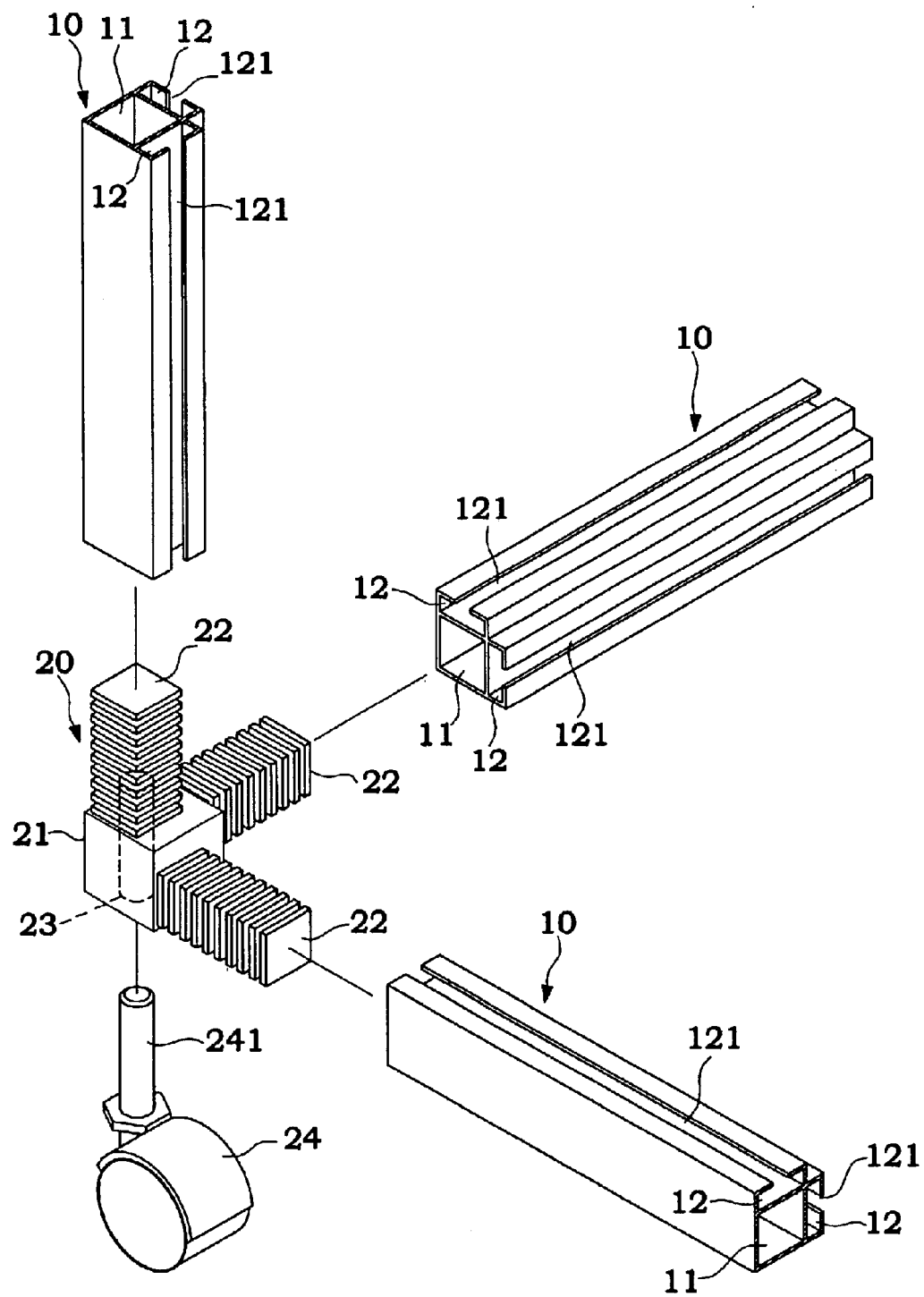
FIG. 5 is an enlarged exploded perspective view of a region enclosed in a circle in FIG. 2.

The modularized birdcage according to the present invention comprises:

a plurality of frame pipes generally designated 10 as shown in FIGS. 3 and 5, each preferably being an aluminum pressed pipe and having a cubic main pipe body 11, and said main pipe body 11 at each of its two externally adjacent sides having a grid plate groove 12 along the direction of the long axis of the main pipe body 11, and both ends of said grid plate groove 12 being open, and an opening being disposed at the center of an external wall;

a plurality of three-way connectors 20 as shown in FIGS. 1 and 5, made of a plastic material and having a cubic main body 21, and said main body 21 at each of its three adjacent sides having an outwardly protruded insert post 22 for allowing an end of the main pipe body 11 of the frame pipe 10 to pass through, and a slippery-proof threaded section being disposed on the surface of the insert post 22 such that the inner wall of the main pipe body 11 producing a slippery-proof effect to prevent the insert post 22 from falling apart from the main pipe body 11; a roller through hole 23 being disposed on said main body 21 for allowing an insert rod 241 on a roller 24 to pass through, and said roller 24 being disposed on the bottom of the three-way connection 20;

a plurality of grid plates 30 as show in FIGS. 1, 2, and 3, each grid plate each 30 comprising a plurality of longitudinal and transversal metal bars, 301, 302 and all longitudinal metal bars 301 being soldered with the transversal metal bars 302 on the same side; the metal bar at the periphery of said grip plate 30 being slidably embedded into the groove of grid plate of said frame pipe 10, thereby a metal bar 301,302 being embedded into the inner side of the grid plate groove 12, and the end of its perpendicularly intersected metal bar 301,302 passing through an opening 121 of the grid plate groove 12;

a plurality of grid plate reinforced rod 40 as shown in FIGS. 1,2, and 4, each being a pressed aluminum rod with a length slightly shorter than the width of the grid plate 30; the cross-sectional structure having an upper and a lower grid plate groove 41, and an opening 411 at the center of the cross-sectional structure along the direction of the long axis; the metal bars at the bottom and top of the two upper and lower grid plates 41 and the grid plate groove 41 of the reinforced rod 40 being intersected and slidably embedded at their ends; the transversal metal bar 302 being embedded into the inner side of the grid plate groove 41, and the longitudinal metal bar 301 passing through the opening 411 of the grid plate groove 41; the way of using said grid plate reinforced rod 40 for the connection increasing the area of the grid plate 30 and providing an excellent support to said grid plate 30.

By means of the foregoing modules, a birdcage 50 of different configurations and variations can be made. As shown in FIGS. 1 and 2, the metal bars at the periphery of the grid plate 30 and the grid plate groove 12 of the frame pipe 10 are intersected and slidably embedded at their ends, and the frame pipes 10 are mutually coupled with a three-way connector 20 to constitute a cage bottom 51, a cage body 53, and a cage top 52 of the birdcage 50. A plurality of rollers 24 can be installed onto the bottom of the three-way connector 20 at the cage bottom 51 as needed. Accessory resting bars, feeding boxes, drinking devices and the like (not shown in the figure) can be installed inside the birdcage. Because such accessories are not key features of this invention, they will not be described here. The grid plate 30 for the cage body 53 may include a door 54 according to the prior art technology.

The above embodiment may use several grid plate reinforced rods 40 and a required number of grid plates 40 depending on the area of the grid plate 30 and the required support. If grid plate reinforced rods are used, the bottom and the top of the upper and lower grid plates 30 should be coupled to the grid plate groove 11 of the reinforced rod first, and then the metal rod at the periphery of the grid plate 30 with the combined grid plate rod 40 are slidably embedded into the grid plate groove 12 of the frame pipe 10. Because the length of the grid plate reinforced rod 40 is shorter than the width of the grid plate 30, both ends of the grid plate reinforced rod 40 will not be embedded into the grid plate groove 12 of the frame pipe 10.

Further, in FIGS. 1 and 2, various measures may be used to support the bottom of the grid plate 30 of the cage body 53 to an appropriate height, and its purpose is to create an accommodating space between the bottom of the cage body 53 and the cage bottom 51 for placing a dirt tray 56. In the embodiment of this invention, a supporting frame 57 is slidably embedded into the grid plate groove 12 of the frame pipe 10 at the cage bottom 51 and the bottom of the cage body 53 first, and then the grid plate 30 of the cage body 53 is disposed; such supporting frame 57 upwardly supports the grid plate 30 of the cage body 53 at a predetermined height, and then the bottom of the grid plate 30 of the cage body 53 is hooked to a bottom grid 58, and a dirt tray 56 can be placed in the space between the bottom grid 58 and the cage bottom 51, and the dirt tray 56 can be drawn out from the reserved opening in the supporting frame 57.

Figure 6:
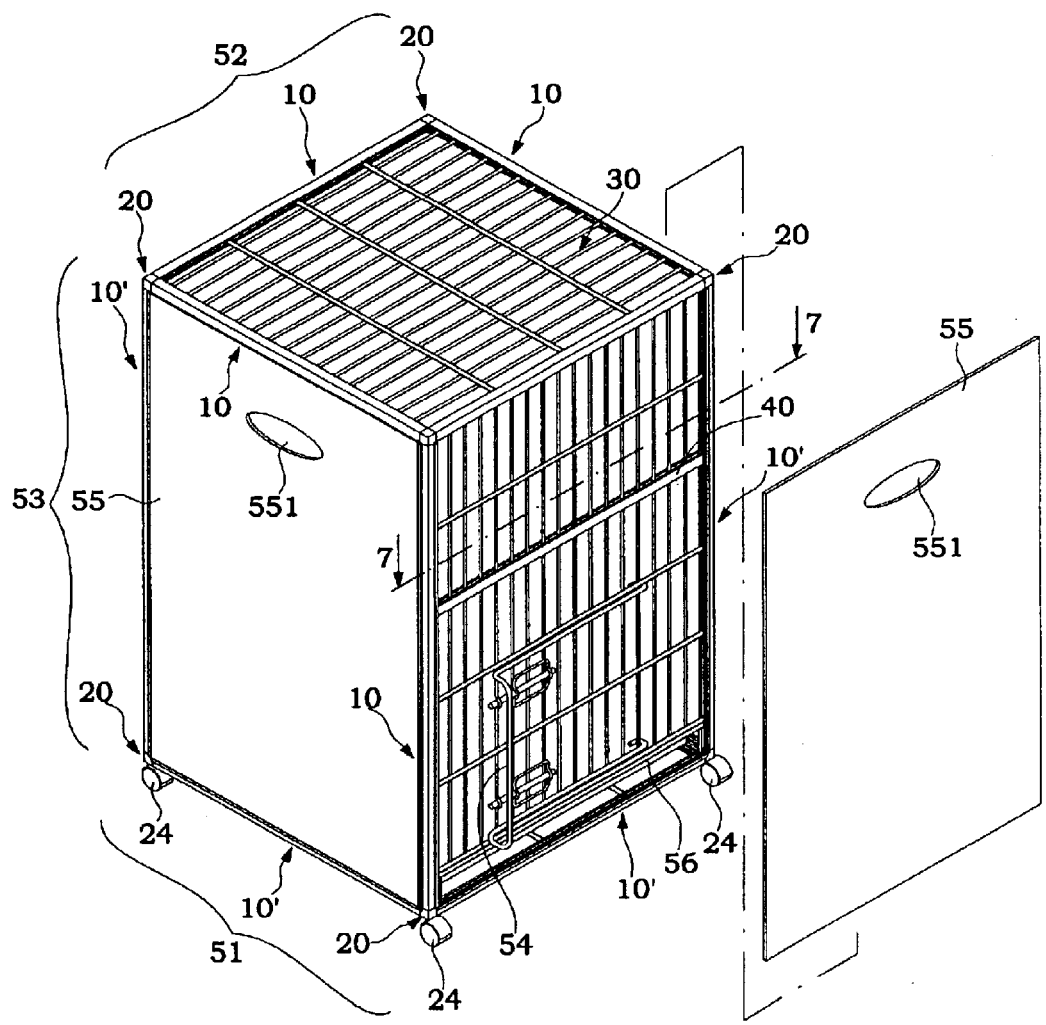
FIG. 6 is a perspective view showing disassembled parts of the birdcage according to a second preferred embodiment of the present invention.
Figure 7:
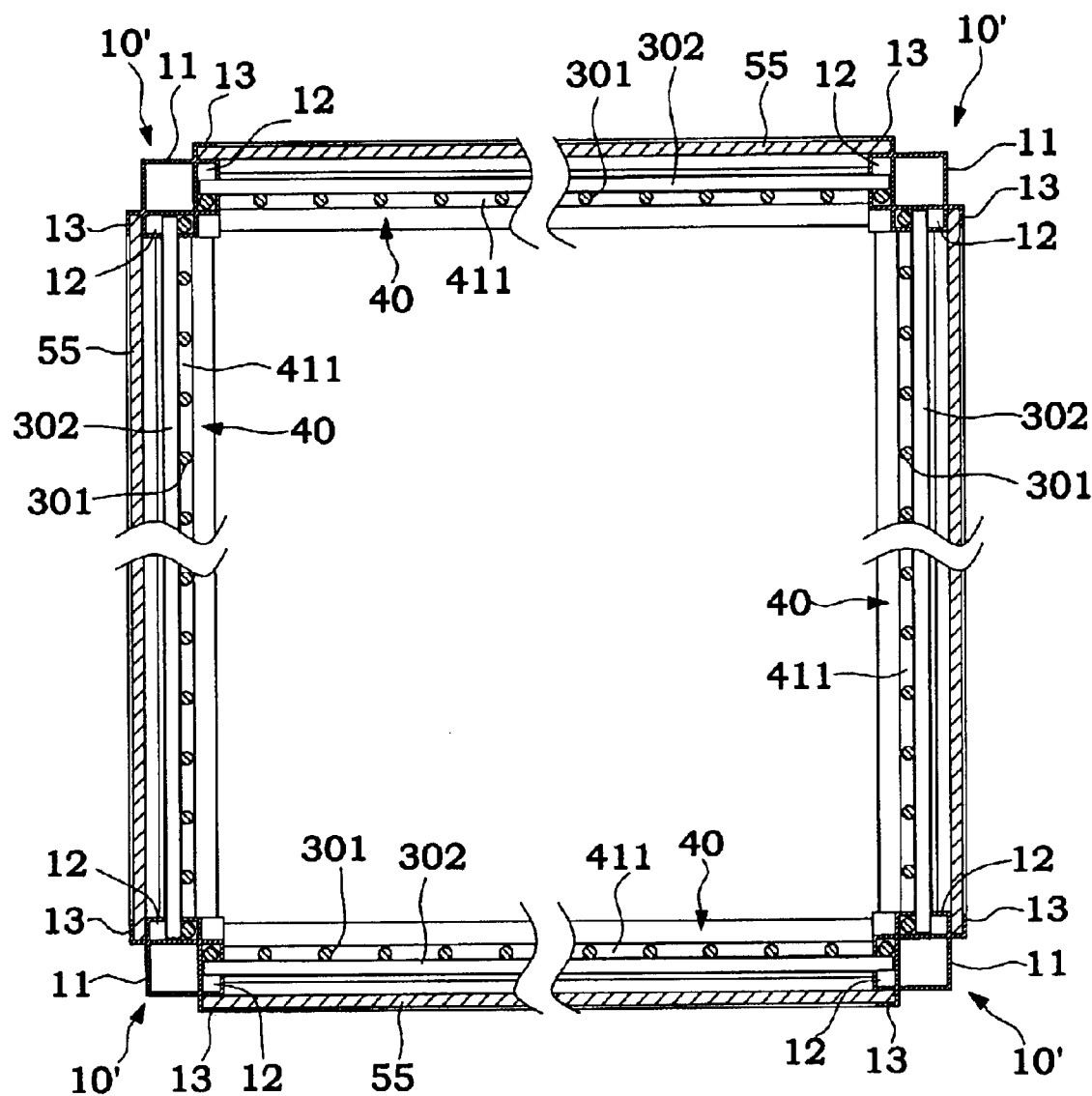
FIG. 7 is a cross-sectional view of the birdcage through cross section 7—7 in a direction of arrows indicated in FIG. 6.

Refer to FIGS. 6 and 7 for the second preferred embodiment of this invention, which has a panel groove 13 disposed at the outer edge of the frame pipe 10' of the cage body 53 and the cage bottom 51, a panel 55 is slidably embedded into the corresponding panel groove 13 of the cage body 53, such that the bottom of the panel 55 can be supported by the panel groove 13 of the cage bottom 51. By the means of the panels surrounding the cage body 53, the bird inside the birdcage can be protected from strong winds or achieve the purpose of keeping the bird warm. A viewing hole 551 is added onto the panel 55 for gripping or viewing.

Figure 8:
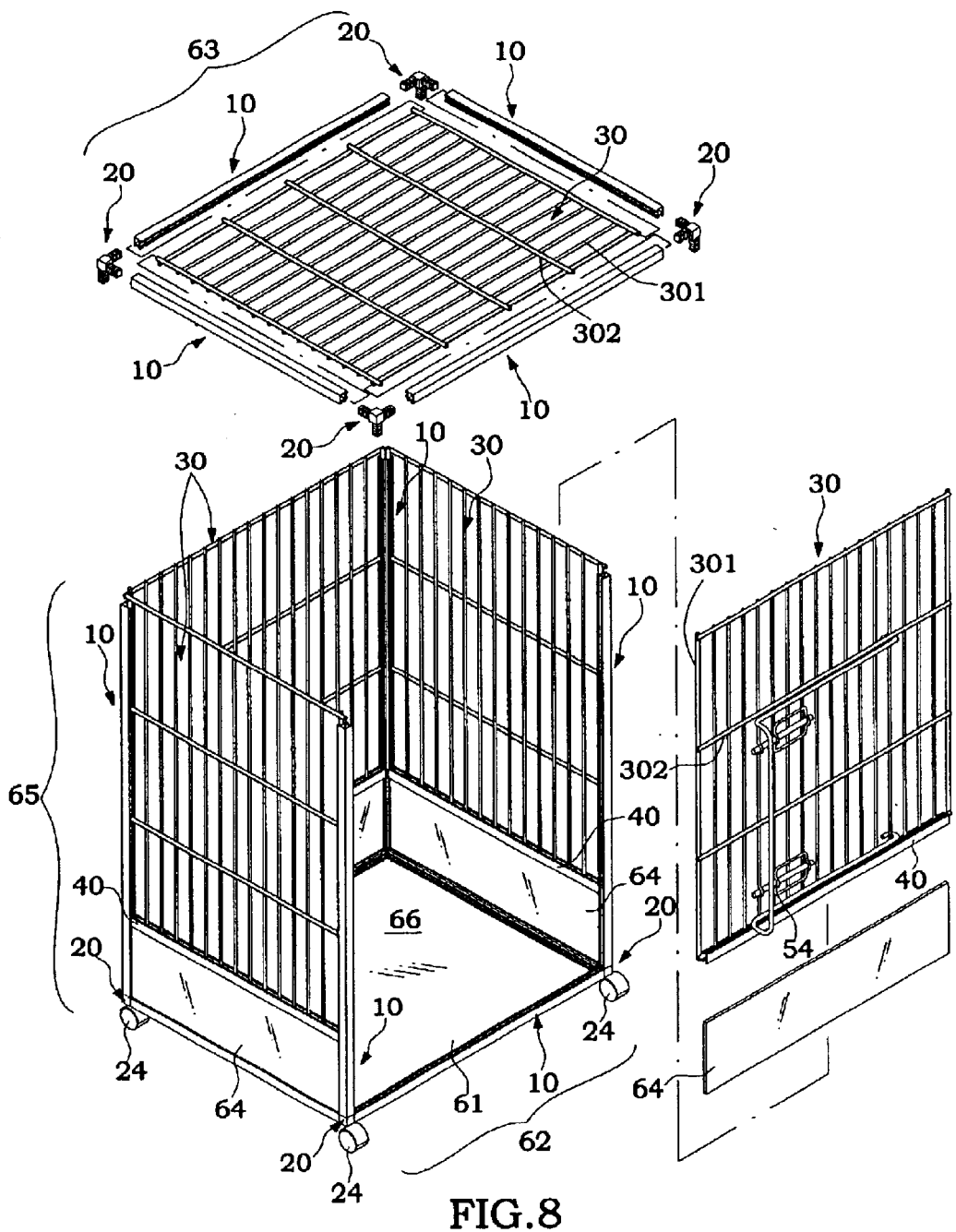
FIG. 8 is an exploded perspective view showing disassembled parts of the birdcage according to a third preferred embodiment of the present invention.
Figure 9:
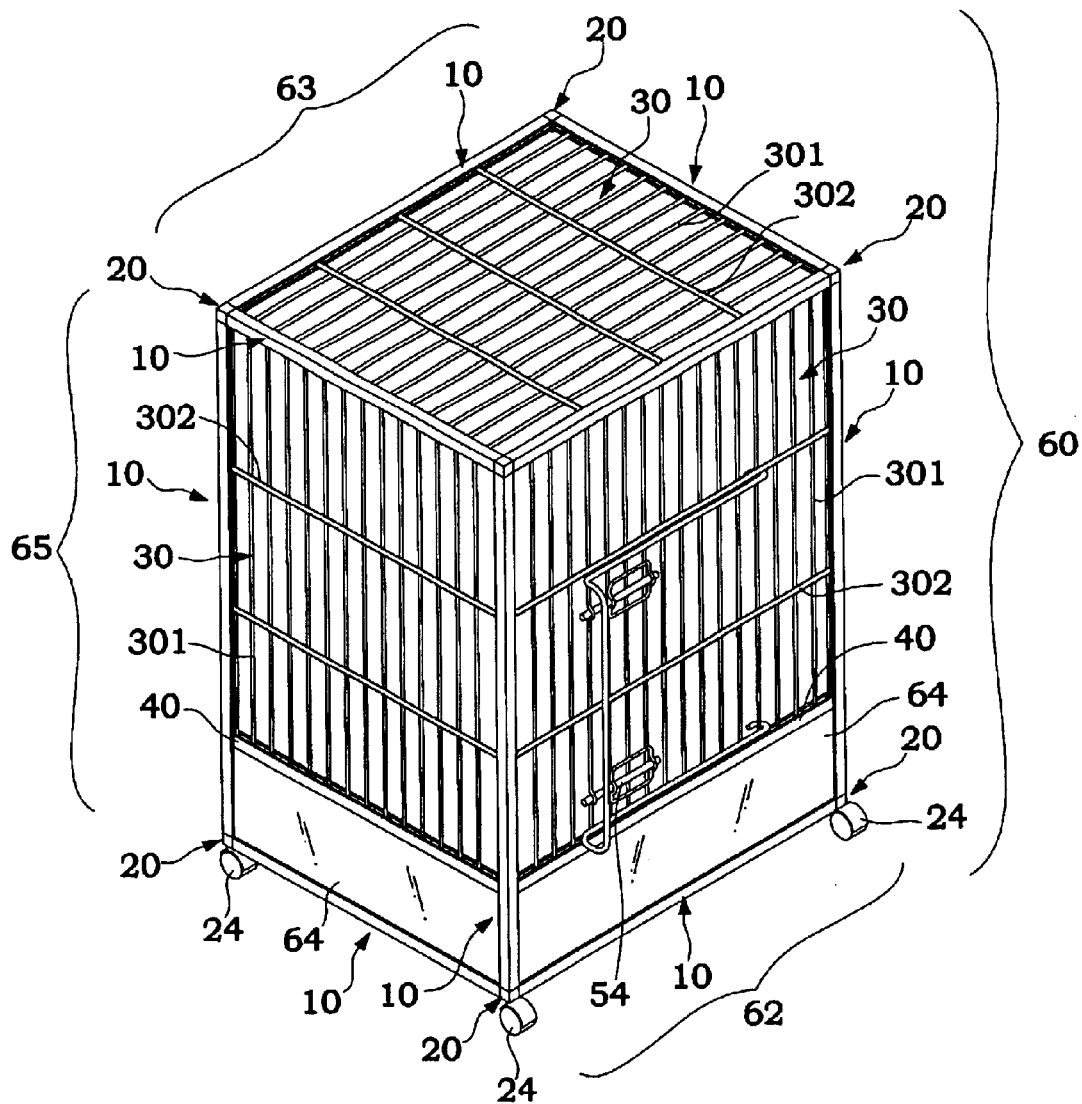
FIG. 9 is a perspective view showing the parts assembled according to FIG. 8.

Refer to FIGS. 8 and 9 for the birdcage 60 according to the third preferred embodiment of this invention. By means of the aforementioned modules and assembling principle, a cage bottom 62, a cage body 65, and a cage top 63 of a birdcage 60 are constructed. However, the grid plate of the cage bottom 62 is replaced by a bottom plate 61, and the cage body 65 is made of transparent side panels 64, grid plate reinforced rods 40, and grid plates 30. The bottom plate 61 and side plate 64 at the cage bottom 62 according to this embodiment constitute another feeding area 66, and such feeding area 66 may be covered with other basic materials such as soil, said, and saw dust for breeding small pets other than birds such as mice, rabbits, etc. As to the way of assembling the cage body 65, four pieces of transparent side panels 64 are embedded downward into the bottom of the frame pipe 10 of the cage body 65 and the frame pipe 10 of the cage bottom 62, and then the bottom of grid plate 30 is slidably embedded into a grid plate reinforced rod 40, and the metal bars at the periphery of the grid plate 30 is slidably embedded downwardly into the grid plate groove 12 of the frame pipe 10 of the cage body 65. The grid groove 41 at the bottom of the grid plate reinforced rod 40 is embedded into the top of the side panel 64.

The birdcage of the present invention can be designed as a combination of several modules, and each module facilitates the reduction of accommodating space and transportation cost. The birdcage of this invention does not require any special tools or special skills for its assembling; the assembling is simple and easy, yet the structure is very stable and reliable. The frame pipe of this invention preferably is made of aluminum (or equal) by pressing, and thus it is not limited to any particular predetermined length. Therefore, such birdcage can adapt different specifications or provide more choices for its shape.

While the present invention has been described by two most practical and preferred embodiments, it is understood that this invention is not limited to the disclosed embodiments but is intended to cover various arrangements included within the spirt and scope of the broadest interpretations and equivalent arrangements.

What is claimed is:

1. A modular cage comprising:
    a plurality of frame pipes, each of the frame pipes comprising a cubic main pipe body including two adjacent sides and a long axis, and each said main pipe body at its said two adjacent sides along a direction of its said long axis having a grid plate groove, and said grid plate groove having an external wall and being open at both ends, and an opening being formed at the center of the external wall;
    a plurality of three-way connectors, each having a cubic main body with three adjacent sides each having an insert post outwardly protruded to receive an end of one of the main pipe bodies of one of the frame pipes tightly pressed therein;
    a plurality of grip plates, each having a metal rod at its periphery and being slidably embedded into a grid plate groove of said frame pipe;
    said grid plate comprised of a plurality of longitudinal and transversal metal bars, and all longitudinal metal bars soldered with all transversal metal bars on the same side;
    two of said grid plates are coupled by a grid plate reinforced rod.

2. The sectional cage of claim 1, wherein said frame pipe is an aluminum pressed pipe.

3. The sectional cage of claim 1, wherein said three-way connector is made of a plastic material.

4. The sectional cage of claim 1, wherein said three-way connector at a surface of its insert post has a slippery-proof threaded section.

5. The sectional birdcage of claim 1, wherein said grid plate reinforced rod has a length shorter than the width of said grid plate; said grid plate reinforced rod has a corresponding upper grid plate groove and a corresponding lower grid plate groove; an opening is disposed at the center of the external wall of said grid plate groove along the direction long axis; the metal rods at the bottom and the top of said grid plate and the grid plate groove of said grid plate reinforced rod are intersected and slidably embedded at their ends; the transversal metal bars are embedded into the inner side of the grid plate groove; and the longitudinal metal bars pass through the opening of the grid plate grove.

6. The sectional birdcage of claim 5, wherein said grid plate reinforced rod is an aluminum pressed rod.

* * * * *